US005803576A

United States Patent [19]

Gallo

[11] Patent Number: 5,803,576

[45] Date of Patent: Sep. 8, 1998

[54] MOTOR VEHICLE HEADLAMP HAVING DIOPTRE LENS MEANS INTERPOSED BETWEEN THE LIGHT SOURCE AND THE REFLECTOR

[75] Inventor: Yann Le Gallo, Saint-Maur, France

[73] Assignee: Valeo Vision, Bibogny Cedex, France

[21] Appl. No.: 591,228

[22] Filed: Jan. 18, 1996

[30] Foreign Application Priority Data

Jan. 19, 1995 [FR] France .................................. 95 00576

[51] Int. Cl.[6] ........................................................ B60Q 1/04

[52] U.S. Cl. ............................ 362/61; 362/280; 362/335

[58] Field of Search ................................ 362/61, 80, 277, 362/280, 281, 284, 319, 324, 335, 328

[56] References Cited

FOREIGN PATENT DOCUMENTS

| | | | |
|---|---|---|---|
| 312442 | 4/1989 | European Pat. Off. ............... | 362/281 |
| 2699259 | 6/1994 | France . | |
| 1097927 | 1/1961 | Germany . | |
| 336546 | 10/1930 | United Kingdom ................... | 362/280 |

*Primary Examiner*—Y My Quach
*Attorney, Agent, or Firm*—Morgan & Finnegan, L.L.P.

[57] ABSTRACT

A motor vehicle headlamp comprises a light source, a reflector and a cover glass together with at least one dioptre lens adapted to be selectively interposed between the light source and at least one zone of the reflector, so as to modify the resulting light beam by refraction. At least one of the dioptre lenses has a generally cylindrical inner surface, the axis of which lies close to an optical axis of the reflector, the optical axis lying close to the light source, and an outer surface, the inclination of which, with respect to the said inner surface varies progressively in such a way as, firstly, to define by refraction progressive de-focussing of the light source, both horizontally along the optical axis and vertically above and below the optical axis, and secondly, to offset some images of the light source, but essentially in a lateral direction only; and the or each dioptre lens defines an angular extent thereof which is limited so that the lens concerned is interposed between the light source and only one lateral zone of the reflector. The application is applicable generally to the selective homogeneous widening of different types of beams.

7 Claims, 2 Drawing Sheets

MOTOR VEHICLE HEADLAMP HAVING DIOPTRE LENS MEANS INTERPOSED BETWEEN THE LIGHT SOURCE AND THE REFLECTOR

FIELD OF THE INVENTION

The present invention relates in general terms to motor vehicle headlamps, which term is to be taken to mean any lighting appliance suitable for mounting on a vehicle for the purpose of illuminating part of the environment of the vehicle, in particular, though not exclusively, the road ahead of the vehicle. More particularly, the invention relates to headlamps capable of producing at least two light beams of different types, using a single light source and a single reflector, and the like.

BACKGROUND OF THE INVENTION

The French published patent specification No. FR 2 699 259A discloses a motor vehicle headlamp which includes a light source, a reflector which is focussed close to the light source, and a cover glass, together with at least one thick strip or lamina made of a material which is capable of allowing to pass through it, towards at least one region of the reflector, at least part of the spectrum of the light emitted by the light source. It also includes motorised means for selectively displacing the thick strip or strips in relation to the light source, so that, by refraction, it defocusses the light source with respect to the reflector and causes the distribution of the radiated light in the resulting light beam to vary.

In one embodiment described in the above mentioned patent specification, the thick strips are in the form of laminae with parallel faces which are transparent to visible light, so as to generate, selectively, a driving beam concentrated on the optical axis and, when the strips are interposed in the path of the light, a wider driving beam.

It is also known, from U.S. Pat. No. 4,373,178, to provide an illuminating lamp in which a dioptric element defining a surface of revolution, with a lens-shaped profile, is interposed between the light source and the reflector. Such a lamp is however designed to meet requirements that have nothing in common with those of motor vehicle lighting.

Finally, it is known from French published patent specification No. FR 1 534 089A to provide a headlamp in which a transparent optical element, giving total reflection, is placed under the lamp with a view to modifying the configuration of the resulting light beam.

One drawback of these known arrangements which employ dioptric lenses lies in the fact that the modification obtained in the light beam when the dioptric lens is (or lenses are) being interposed, is not well controlled. More precisely, although it effectively results in some widening of the beam, it also gives rise to an undesirable increase in the thickness (i.e. the vertical depth) of the beam, with too much light being either close to the vehicle or above the road.

DISCUSSION OF THE INVENTION

An object of the present invention is to overcome the limitations of the prior art mentioned above, and to provide a headlamp that includes a dioptric lens which can be selectively interposed between the light source and the reflector, and which is capable of producing a widened beam, and in particular a widened driving beam, having the required qualities.

According to the present invention, a headlamp for a motor vehicle, comprising a light source, a reflector, and a cover glass, together with at least one dioptric lens which is adapted to be interposed selectively between the light source and at least one zone of the reflector to modify by refraction the light beam that is generated. The headlamp is characterised in that at least one dioptric lens includes a generally cylindrical inner surface, the axis of which lies close to an optical axis of the reflector, the optical axis lying close to the light source. The headlamp has an outer surface, the inclination of which with respect to the inner surface varies progressively in such a way as, firstly, to define, by refraction, progressive de-focussing of the light, both horizontally along the optical axis and vertically above and below the optical axis. Secondly, the inclination affects images of the light source essentially in a lateral direction only, and in that the dioptric lens or lenses to define an angular extent thereof which is limited so that the lens is interposed between the light source and only one lateral zone of the reflector.

Some preferred, but not limiting, features of the invention are as follows:

The inner surface of the or each dioptric lens is defined on a cylinder of revolution.

The headlamp includes two identical dioptric lenses which are arranged to be interposed on either side of the light source.

In the horizontal direction, the or dioptric lens or lenses provides de-focussing which diminishes progressively from a region thereof close to the base of the reflector, towards a region of the dioptric lens remote from the base of the reflector. In a preferred version of such an arrangement, the mutual inclination of the inner and outer faces of the dioptric lens or lenses, in a horizontal plane passing through the optical axis, diminishes in a substantially linear relationship as a function of distance along the optical axis.

In the vertical direction the de-focussing is minimal and preferably zero in a horizontal plane passing through the optical axis, to reach two maximum values at the upper and lower ends of each dioptric lens.

The dioptric lens or lenses is truncated at its end remote from the base of the reflector, in such a way as to leave a marginal portion of the reflector directly exposed to the light source regardless of the position of the dioptric lens. The dioptric lens or lenses is then preferably truncated by a generally conical surface centred on the optical axis.

Further features, objects and advantages of the present invention will appear more clearly on a reading of the following detailed description of preferred embodiments of the invention, given by way of non-limiting example only and with reference to the accompanying drawings.

DESCRIPTION OF PREFERRED EMBODIMENTS OF THE INVENTION

First, it will be noted that, as between one Figure of the drawings and another, elements or parts that are identical or similar to each other are designated as far as possible by the same reference signs.

Figure 1:
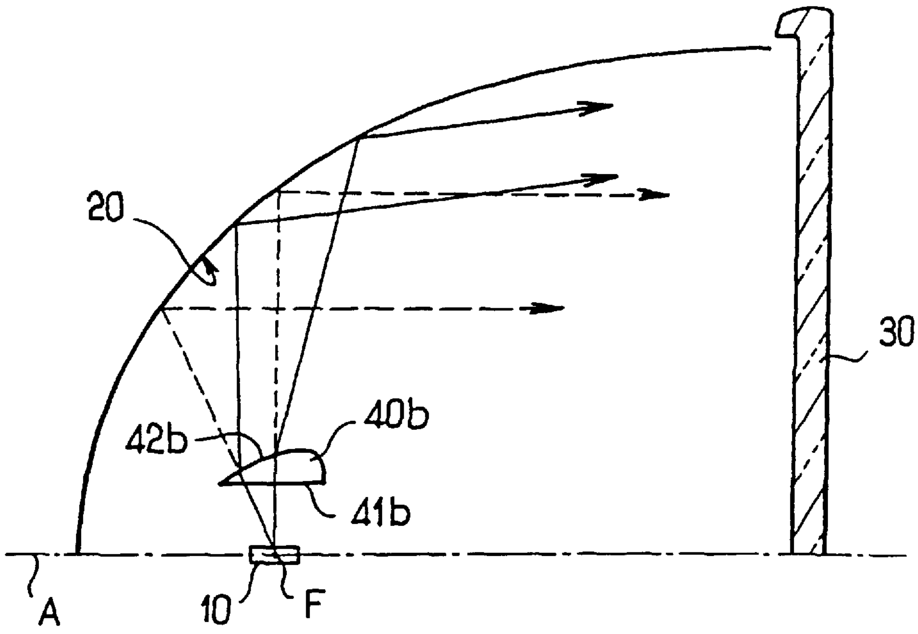
FIG. 1 is a diagrammatic half view, in horizontal cross section, of a headlamp in accordance with the present invention.
Figure 2:
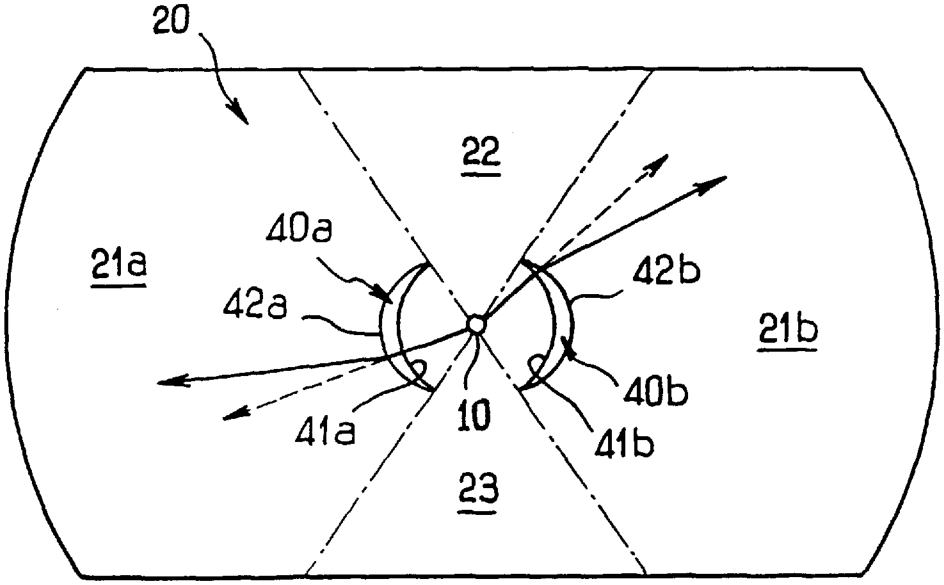
FIG. 2 is a front view of part of the headlamp of FIG. 1.

Reference is made first to FIGS. 1 and 2, which show a motor vehicle headlamp that comprises: a light source 10, in this case the generally cylindrical filament of an incandescent lamp; a reflector 20 of the parabolic type, which is focussed at F on the light source 10 or close to the latter; a cover glass 30; and two displaceable dioptric lenses or supplementary lenses 40*a* and 40*b*. These dioptric lenses are arranged so that they can be selectively interposed between the light source 10 and certain zones of the reflector 20.

Each dioptric lens is arranged to be moved selectively so as to occupy an inactive or retracted position (not shown), for example by being displaced in straight line or translational movement through apertures disposed in the base portion, or central region, of the reflector 20, and an accurately predetermined working or active position such as is shown in FIGS. 1 and 2.

The means whereby the dioptric lenses are supported will not be described here, and nor will the motorised actuating means for displacing the dioptric lenses between their retracted and working positions. Such actuating means may for example be of the type described in French published patent specification No. FR 2 699 259A.

The dioptric lenses 40*a* and 40*b* are preferably made of glass. If desired, however, these dioptric lenses may be of a material adapted to effect spectral splitting of the light, in accordance with the provisions of the above mentioned French patent specification.

As can best be seen in FIG. 2, the reflector 20 is divided into four zones, namely two lateral zones 21*a* and 21*b*, an upper zone 22, and a lower zone 23. The lateral zones 21*a* and 21*b* are the zones that are covered by the solid angle of the respective dioptric lens 40*a* or 40*b* as seen from the focus F of the reflector. The other two zones 22 and 23 remain directly exposed to the light propagated by the source 10, regardless of the position of the dioptric lenses.

Each dioptric lens 40*a*, 40*b* has an inner surface, 41*a*, 41*b* respectively, which as shown best in FIG. 2 is in the form of part of a cylinder of revolution and which is centred, at least approximately, on the optical axis A of the headlamp on which the filament 10 is aligned. Each dioptric lens also has an outer surface, 42*a*, 42*b* respectively, having a complex profile which is so chosen as to ensure variable de-focussing of the light source 10, in order to widen the headlamp beam but without giving rise to any significant increase in the vertical height (or thickness) of the beam. In addition, these outer surfaces 42*a*, 42*b* are designed so as to ensure that the spread of the beam is very homogeneous, by means of progressive de-focussing steps. If necessary, this homogeneity is obtained at the cover glass.

More precisely, the outer surface 42*a* or 42*b* is a surface such that, in cross sections through planes passing through the optical axis of the headlamp, the mutual inclination of the traces of the inner and outer surfaces in such planes varies progressively, between a maximum mutual or included angle, which may for example be of the order of 45°, at the rear end of the dioptric lens (i.e. on the left in FIG. 1), and a minimum mutual inclination, which may for example be in the range from a few degrees to 10°, at the front end of the dioptric lens (i.e. on the right in FIG. 1).

In addition, the outer surfaces 42*a* and 42*b* of the dioptric lenses are such that, in cross sections taken through vertical planes at right angles to the optical axis of the headlamp, the inclination of the traces of the inner and outer surfaces of each dioptric lens, or the included angle between the respective inner and outer surfaces 41*a* and 42*a*, for example, of the lens 40*a* varies between maximum values (for example of the order of 20° to 25°) at the upper and lower ends, and a minimum value (i.e. a zero angle) at mid-height of the dioptric lens.

Figure 5:
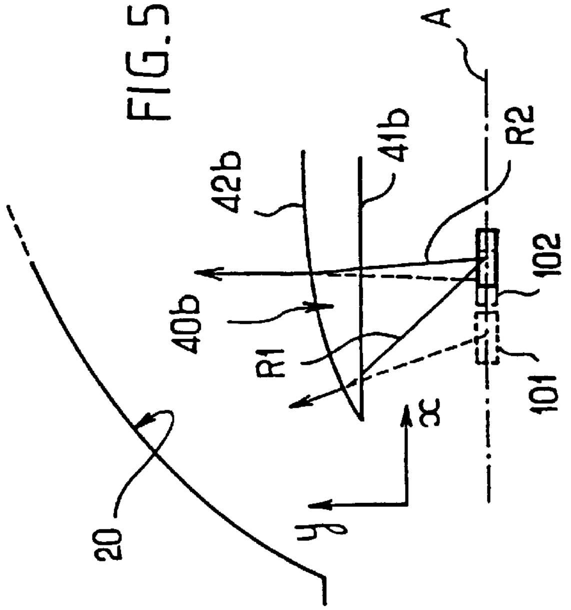
FIG. 5 is a view on a larger scale, showing the optical behavior of a part of the headlamp of FIG. 1 in a horizontal plane.

Reference is now made to FIG. 5, which shows two different de-focussing effects for two different directions of the light emitted from the focus in the horizontal axial plane. For the light ray R1 which is directed the most towards the rear, the dioptric lens 40*b* creates a virtual light source 101 which lies substantially behind the real light source. For the light ray R2 that is inclined towards the rear by the least amount, the virtual light source 102 which is obtained is offset towards the rear by a smaller amount.

It will therefore be understood that de-focussing reduces progressively according to the amount by which the dioptric lens is displaced from the rear towards the front, so that in this way the light beam is given an essentially continuous lateral spread.

In addition, it can be seen that, in the case of FIG. 5, de-focussing is reduced by a greater amount as the point of incidence of the light ray on the reflector is moved further away. This signifies that the small images of the filament in the light beam are diverted horizontally to a lesser extent than are the large images. That part of the light beam that is emitted by the lateral zones 21*a*, 21*b* (FIG. 2) of the reflector therefore retains a spot of concentrated light in the axis of the vehicle.

Figure 6:
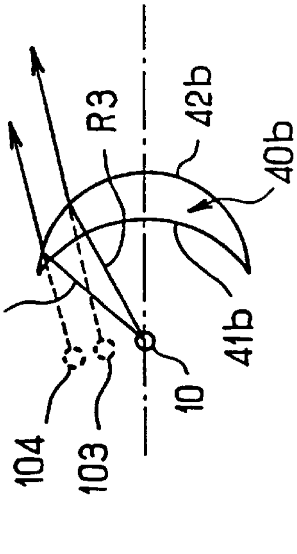
FIG. 6 is a view on an enlarged scale showing the optical behavior of a part of the headlamp of FIG. 1 in a vertical plane transverse to the optical axis.

Reference is now made to FIG. 6, in which it will be observed that the more the light rays R3 and R4, propagated from the focus, are inclined upwardly or downwardly, the more will the corresponding virtual light source, 103 or 104 respectively, be offset, again upwardly or downwardly.

Figure 7:
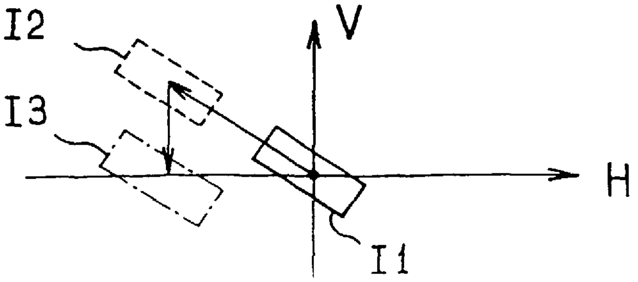
FIG. 7 shows, in a plane of projection, the displacement of an image of the filament caused by the interposition of a dioptric lens, the cover glass of the headlamp being omitted in this Figure.

If an observer is now placed at any point whatever relative to the dioptric lens, it would be understood that the effects illustrated in FIGS. 5 and 6 become cumulative, so that they widen the light beam in a variable manner without having any significant influence on its vertical distribution. More precisely, and with reference now to FIG. 7, an inclined image of the filament, designated by the reference sign I1, which would in practice be centred on the reference centre of a projection screen in the absence of the dioptric lens, will, due to the presence of the dioptric lens, undergo, firstly a displacement along its major axis to obtain the image I2, and secondly, a vertical displacement to return to a level close to that of the optical axis, as indicated by the image I3.

The net effect of the dioptric lens is thus to displace an image I1 in a generally lateral or sideways direction to the position I3.

The fact that the dioptric lenses 40*a* and 40*b* extend by a limited angular amount on either side of the light source 10 permits manipulation of the images of the light source which evolve between a horizontal orientation and a particular oblique orientation, which is determined by this angular amount. In this way, the increase in width is effected on images which are of limited height in a plane of projection.

By contrast, the images of the filament which are generated by the upper zone 22 and lower zone 23, and which have the twin features that they are both large in size and disposed either vertically or slightly inclined with respect to the vertical, are not spread by the dioptric lenses. In this connection, it has been found that an offset of this type of image by dioptric means cannot be obtained without compromising the quality of the widened light beam. Therefore, these images are always in the same position in the beam.

Figure 3:
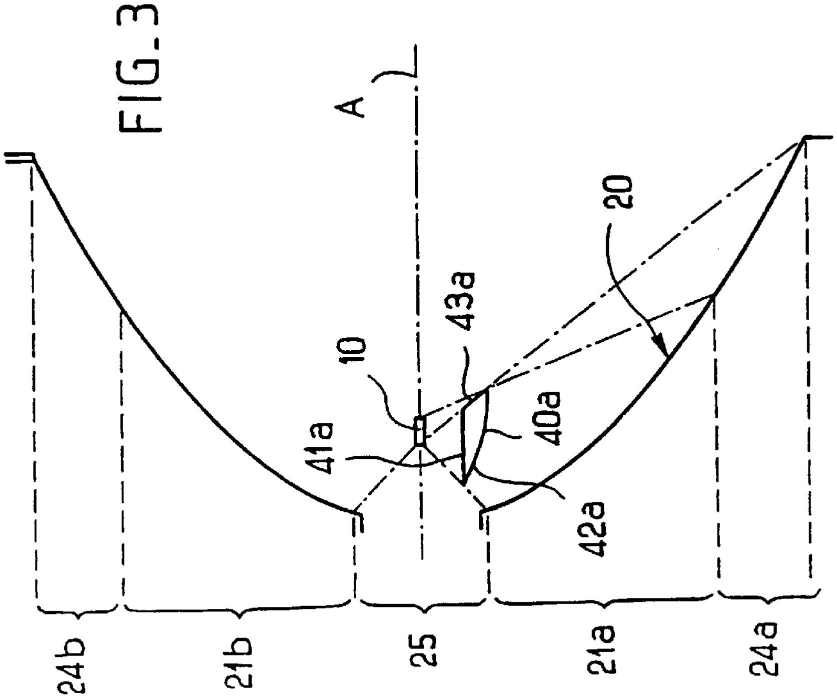
FIG. 3 is a view in horizontal cross section of a headlamp in another embodiment in accordance with the invention.
Figure 4:
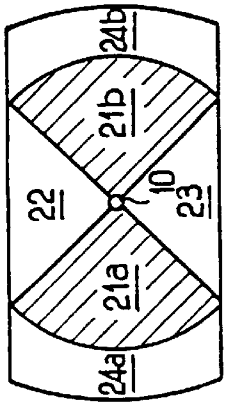
FIG. 4 is a front view of the reflector of the headlamp of FIG. 3, showing its various zones.

Reference is now made to FIGS. 3 and 4, which show a modified embodiment of a headlamp in accordance with the invention. In this embodiment, each dioptric lens of which the lens 40*a* of FIG. 3 is typical truncated in its forward region, in such a way as to leave on the reflector 20, outside the lateral zones 21*a* and 21*b* which are affected by the dioptric lenses, two marginal zones 24*a* and 24*b*. These marginal zones receive directly the light emitted by the source 10, regardless of whether the dioptric lenses are in their retracted position or their working position.

The effect whereby the dioptric lenses are truncated is preferably defined by conical terminal surfaces, such conical surface 43*a* indicated in FIG. 3 for the lens 40*a,* the axis of generation for the conical surface coinciding and being in alignment with the optical axis.

In this way, when the dioptric lenses are put in their working position, only images emitted from the base portion of the reflector, and images of moderate size of the filament, will be processed by the dioptric lenses, so that the light beam is thus widened homogeneously; while the small images generated by the marginal zones 24*a* and 24*b,* which are furthest away from the filament, remain positioned on the axis of the light beam so as to preserve a high concentration of light in the beam along this axis.

The reflector shown in FIG. 4 thus has six zones 21*a,* 21*b,* 22, 23, 24*a* and 24*b.* Of these, only the lateral zones 21*a* and 21*b,* which form a kind of butterfly-wing pattern over part only of the width of the reflector 20, are affected by the dioptric lenses when the latter are interposed. FIG. 3 also shows a zone 25 corresponding to the hole through the base portion of the reflector in which the incandescent lamp is accommodated.

The outer surface of each dioptric lens, of which the outer surface 42*a* in FIG. 3 is typical, may be defined either empirically or mathematically, according to the result desired.

One possible equation is given below for the trace of the outer surface 42*b* of the dioptric lens 40*b* in the horizontal axial plane. This equation is related to the coordinates (x, y) shown in FIG. 5.

$$y(x)=\int_{Dx}\tan(A(x)).dx$$

where: $A(x)=\alpha(1-(x/l))$;

Dx=[O; 1];

O=the origin of the coordinates at the intersection of the traces 41*b* and 42*b;* and l=length of the surface along the x axis.

This integration gives:

$$y(x)=(l/\alpha).\ln(\cos(A(\alpha)/\cos(\alpha)).$$

This equation enables a reduction to be made in the mutual inclination of the traces 41*b* and 42*b* which develops linearly as a function of the value of x. A profile that gives a non-linear development can of course be provided.

In the foregoing description, the reflector 20 is parabolic, that is to say it generates a long-range, relatively narrow beam when the dioptric lenses are in their retracted position, while in the presence of the dioptric lenses, i.e. when the latter are in their working position, it generates a widened beam but with good concentration of light on the axis of the vehicle.

The invention can of course also be applied in other types of lighting appliances for illuminating purposes. In particular, due to the fact that the dioptric lenses provided by this invention enable modification of the vertical height of the beam to be virtually avoided, such lights can be used with reflectors of the kind which themselves generate cut-off beams, that is to say those having a surface so calculated as to put all of the images of the filament below a given cut-off limit or line, preferably by aligning the topmost points of these images on the cut-off line. The invention can, accordingly, also be employed in foglights; it is also applicable to driving lamps complementary to the headlamps.

In another embodiment of interest, dioptric lenses in accordance with the invention can be used in order to convert a long-range driving beam into a beam suitable for use in fog, due to the ability of the dioptric lenses to cause a downward displacement of the images.

Moreover, in a further embodiment, in order to reduce the proportion of light that is subject to widening by the dioptric lenses, it is possible to arrange only a single dioptric lens, on one side of the light source.

So that this proportion can be modified as desired, it is also possible to vary the angular extent of the dioptric lenses that determines the relative size of the surfaces 21*a* and 21*b* with respect to the surfaces 22 and 23.

What is claimed is:

1. A vehicle headlamp comprising: a light source, a reflector for reflecting light from the light source to produce a light beam, said reflector having an optical axis generally coincident with the light source, the reflector having a plurality of reflecting zones; at least one dioptric lens adjacent to the light source in which the dioptric lens is interposed optically between the light source and at least one of the reflecting zones of the reflector to modify the light beam by refraction, wherein the dioptric lens has an inner surface which is a part of a cylinder of revolution having an axis essentially coincident with the optical axis, and an outer surface having a variable inclination with respect to the inner surface, the inclination varying progressively to establish by refraction a progressive defocussing of the light, along the optical axis and perpendicular to the optical axis, and to displace images of the light source, relative to the light source, the dioptric lens having an angular extent so that the lens is interposed optically between the light source and an adjoining zone of the reflector.

2. A headlamp according to claim 1 having two identical dioptric lenses disposed on either side of the light source.

3. A headlamp according to claim 1, wherein the reflector has a base portion, the dioptric lens having a first region close to the base portion and a second region remote from the base portion, the dioptric lens defocussing the light by an amount which decreases progressively from the first region to the second region of the dioptric lens.

4. A headlamp according to claim 1, wherein the dioptric lens has two ends producing a minimum of defocussing in a plane intersecting the optical axis and producing maximum defocussing at the two ends of the dioptric lens.

5. A vehicle headlamp comprising: a light source, a reflector for reflecting light from the light source to produce a light beam, said reflector having an optical axis generally coincident with the light source, the reflector having a plurality of reflecting zones; at least one dioptric lens adjacent to the light source in which the dioptric lens is interposed optically between the light source and at least one of the reflecting zones of the reflector to cause the light beam to be modified by refraction, wherein the dioptric lens has an inner surface which is a part of a cylinder of revolution having an axis essentially coincident with the optical axis, and an outer surface having a variable inclination with respect to the inner surface, the inclination varying progressively to establish by refraction a progressive defocussing of the light, along the optical axis and perpendicular to the optical axis, and to displace images of the light source relative to the light source, the dioptric lens being interposed optically between the light source and an adjoining zone of the reflector, wherein the reflector has a base portion, the dioptric lens having a first region close to the base portion and a second region remote from the base portion, the dioptric lens defocussing the light by an amount which decreases progressively from the first region to the second region of the dioptric lens, and in which the inclination, in a plane intersecting the optical axis, diminishes in a substantially linear manner as a function of distance along the optical axis.

6. A vehicle headlamp comprising: a light source, a reflector for reflecting light from the light source to produce a light beam, said reflector having an optical axis generally coincident with the light source, the reflector having a plurality of reflecting zones; at least one dioptric lens adjacent to the light source in which the dioptric lens is interposed optically between the light source and at least one of the reflecting zones of the reflector to cause the light beam to be modified by refraction, wherein the dioptric lens has an inner surface which is a part of a cylinder of revolution having an axis essentially coincident with the optical axis, and an outer surface having a variable inclination with respect to the inner surface, the inclination varying progressively to establish by refraction a progressive defocussing of the light, along the optical axis and perpendicular to the optical axis, and to displace images of the light source relative to the light source, the dioptric lens being interposed optically between the light source and an adjoining zone of the reflector, wherein the reflector has a base portion, the dioptric lens having an end remote from the base portion and being truncated at the remote ends leaving a marginal reflecting portion of the reflector directly exposed to the light source regardless of the position of the lens.

7. A headlamp according to claim 6, wherein the dioptric lens has a generally conical surface on the remote truncated end of the lens, the generally conical surface having an axis of symmetry that is coincident with the optical axis.

* * * * *

UNITED STATES PATENT AND TRADEMARK OFFICE
CERTIFICATE OF CORRECTION

PATENT NO. : 5,803,576
DATED : September 8, 1998
INVENTOR(S) : Yann Le Gallo

It is certified that error appears in the above-identified patent and that said Letters Patent is hereby corrected as shown below:

On the title page, item [19], please correct the inventor's surname from "Gallo" to --Le Gallo--.

On the title page item [54], and column 1, replace "DIOPTRE" with --DIOPTRIC--.

In Claim 6, line 17, replace "ends" with --end--.

Signed and Sealed this

Thirteenth Day of April, 1999

Attest:

Q. TODD DICKINSON

Attesting Officer

*Acting Commissioner of Patents and Trademarks*